US012601210B2

(12) United States Patent
Saycon et al.

(10) Patent No.: US 12,601,210 B2
(45) Date of Patent: Apr. 14, 2026

(54) DOOR HANDLE SYSTEM FOR A SAFETY DOOR, ESPECIALLY FOR A SLIDING DOOR OR A SWING DOOR

(71) Applicant: SICK AG, Waldkirch (DE)

(72) Inventors: Omar Saycon, San Fernando Cebu (PH); Julio Sandino Plariza, Cebu (PH); Sheau Shiang Liew, Iskandar Puteri (MY); Mao Ai Fu, Singapore (SG)

(73) Assignee: SICK AG, Waldkirch (DE)

( * ) Notice: Subject to any disclaimer, the term of this patent is extended or adjusted under 35 U.S.C. 154(b) by 27 days.

(21) Appl. No.: 18/758,606

(22) Filed: Jun. 28, 2024

(65) Prior Publication Data

US 2025/0034920 A1 Jan. 30, 2025

(30) Foreign Application Priority Data

Jun. 29, 2023 (EP) .................................... 23182445

(51) Int. Cl.
*E05C 1/06* (2006.01)
*E05B 63/04* (2006.01)
(Continued)

(52) U.S. Cl.
CPC .............. *E05C 1/06* (2013.01); *E05B 63/042* (2013.01); *E05C 1/004* (2013.01); *E05B 65/00* (2013.01)

(58) Field of Classification Search
CPC ... E05C 1/00; E05C 1/004; E05C 1/02; E05C 1/06; E05C 9/02; E05C 9/021; E05C 9/10;
(Continued)

(56) References Cited

U.S. PATENT DOCUMENTS 2,486,460 A * 11/1949 Bonenberger ...... E05B 65/0003 312/215
3,308,579 A * 3/1967 Thams .................... E05D 15/52 49/192
(Continued)

FOREIGN PATENT DOCUMENTS

CN 209261395 U 8/2019
DE 29723271 U1 8/1998
(Continued)

OTHER PUBLICATIONS

European Search Report for corresponding application 23182445.9 issued Dec. 12, 2023.

*Primary Examiner* — Christine M Mills
*Assistant Examiner* — Yahya Sidky
(74) *Attorney, Agent, or Firm* — Nath, Goldberg & Meyer; Jerald L. Meyer

(57) ABSTRACT

A door handle system mountable to a safety door that opens to the left as well as to a safety door that opens to the right without changing the internal structure of the door handle system. This eases the installation of the door handle system. For doing so, the handle is attached to a gear especially in form of a sector gear. Upon pressing the handle, the gear rolls along a respective one out of two gear racks arranged on opposite second and third sides of a frame structure. A bolt is attached to the frame structure. Depending on the orientation of the door handle system and therefore whether it is installed on left or right opening doors, the gear engages with one of the two gear racks during rotation.

17 Claims, 9 Drawing Sheets

Figure 1:
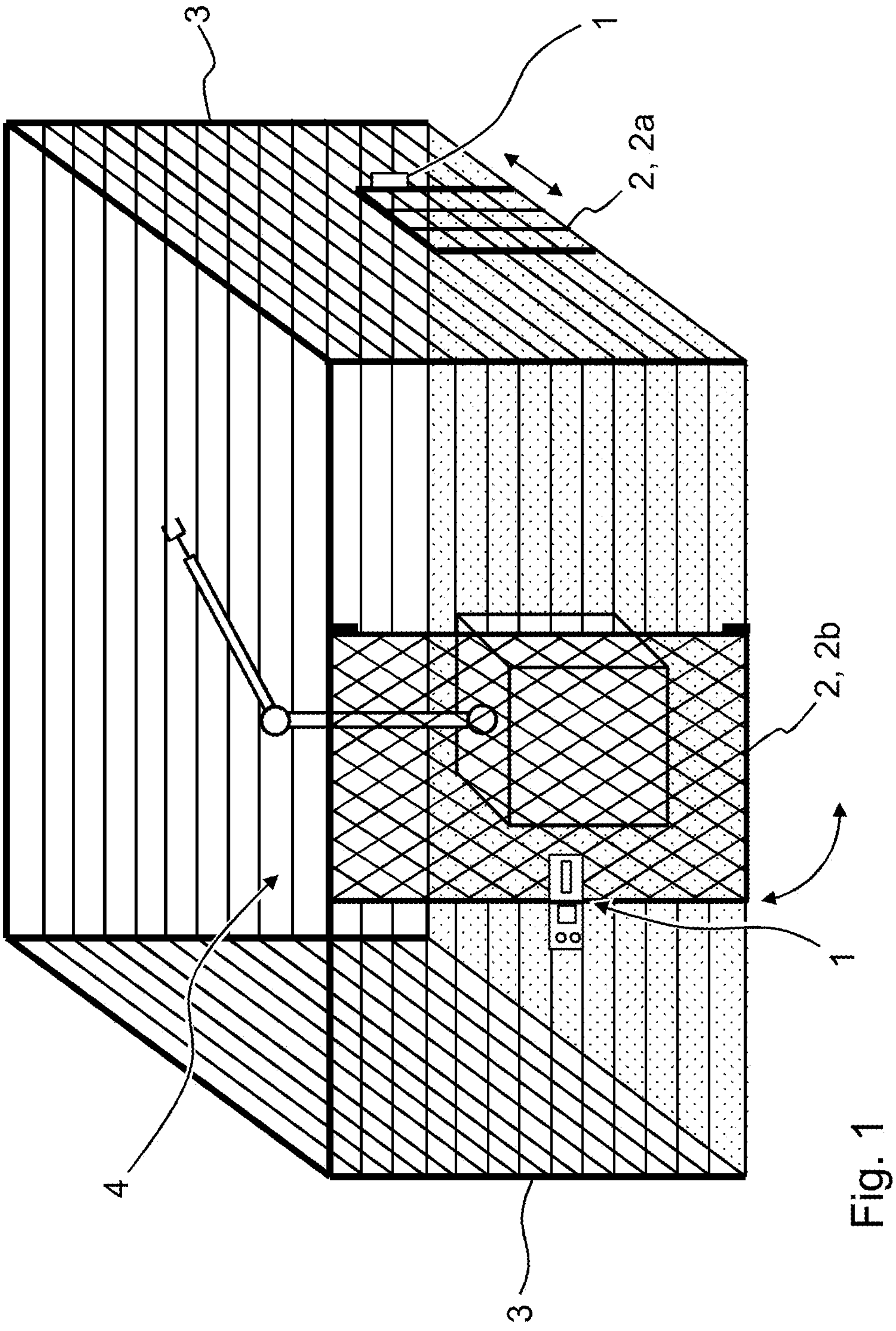

(51) Int. Cl.
*E05B 65/00* (2006.01)
*E05C 1/00* (2006.01)

(58) Field of Classification Search
CPC ...... E05C 9/12; E05B 67/383; E05B 65/0007; E05B 65/0028; Y10T 292/1018; Y10T 292/102; Y10T 292/307; Y10T 292/0843
See application file for complete search history.

(56) References Cited

U.S. PATENT DOCUMENTS

| | | | | | |
|---|---|---|---|---|---|
| 6,485,067 | B1 * | 11/2002 | Root | .................... | E05C 9/021 292/279 |
| 2010/0071424 | A1 * | 3/2010 | Tsuruta | .................... | E05B 83/30 70/91 |

FOREIGN PATENT DOCUMENTS

| | | | | | |
|---|---|---|---|---|---|
| FR | 2772062 | A1 | 6/1999 | | |
| NL | 6340 | C | 11/1921 | | |
| WO | WO-2020081702 | A1 * | 4/2002 | ............. | E05C 9/041 |

* cited by examiner

DOOR HANDLE SYSTEM FOR A SAFETY DOOR, ESPECIALLY FOR A SLIDING DOOR OR A SWING DOOR

The invention describes a door handle system for a safety door, especially for a sliding door or swing door.

Door handle systems are used almost in every door. In the simplest form they comprise a movable bolt and a lock in which the bolt can engage. Depending on the needs, door handle systems may also comprise various electronic components which can be used to control different devices. Such door handle systems can therefore be used as safety doors and shut down devices, for example for robots, if the door is opened to avoid injuries.

Door handle system come with various options. For example, there are dedicated door handle variants for left and right door hinged installations. Current designs lack ease of installation and are not user-friendly for both left and right mounting in the customer's location.

The object of the present invention therefore is to improve the current door handle design in such a way that it overcomes the known problems.

The object is solved by the door handle system according to the independent claim 1. The dependent claims show preferred embodiments of the door handle system.

The door handle system according to the present invention can be used for a safety door, especially for a sliding door or swing door. The door handle system comprises a bolt unit. The bolt unit comprises a housing with a bolt opening. The bolt unit also comprises a handle. The handle is arranged at (attached to) the housing. The bolt unit comprises a frame structure with a bolt. The frame structure is arranged in the housing. The frame structure is movable with respect to the housing. The frame structure encloses a receiving room. The bolt is arranged at a first side of the frame structure, wherein a second side and a third side of the frame structure are arranged opposite to each other. The second side and the third side each comprise a gear rack directed to the receiving room, so that the gear racks of the second side and third side face each other. The bolt unit comprises a gear, especially in form of a sector gear, which is arranged within the receiving room. The handle is attached to the gear so that pressing the handle translates into a rotation of the gear. Upon rotation of the gear from a starting position to an end position, the gear is configured to get into contact with the corresponding gear rack, causing the frame structure to be displaced from a first position into a second position in relation to the housing thereby pushing the bolt out of the bolt opening.

It is very beneficial that the that there are two gear racks, because this allows the sector gear to rotate along the gear rack of the second side or around the gear rack of the third side. Therefore, the door handle system can easily be installed on safety doors that open to the left as well as on safety doors that open to the right, wherein the handle is pressed in the same direction.

In a preferred embodiment of the invention, the frame structure is in the form of a rectangle or a square.

In a preferred embodiment of the invention, the bolt is arranged within the housing if the frame structure is in the first position. Contrary to that, the bolt is pushed out of the housing if the frame structure is in the second position.

In a preferred embodiment of the invention, the frame structure is in the first position if the gear is in the starting position. Furthermore, the frame structure is in the second position if the gear is in the end position.

In a preferred embodiment of the invention, the bolt is attached to the frame structure, for example by a screwing connection. Alternatively, the bolt and the frame structure are made of a single piece.

In a preferred embodiment of the invention, the respective gear rack forms the second or third side of the frame structure. Alternatively, the respective gear rack is screwed to the second or third side of the frame structure.

In a preferred embodiment of the invention, the bolt opening is aligned in the middle of the housing and is therefore spaced apart by the same distance from the top and the bottom of the housing. This increases the symmetry of the housing. Preferably, the bolt opening is also spaced apart by the same distance from the left side and the right side of the housing.

In a preferred embodiment of the invention, the bolt opening is arranged in a front side of the housing, wherein the handle is attached to a side (left side or right side) of the housing.

In a preferred embodiment of the invention, the gear is arranged rotatable but stationary with respect to the housing.

In a preferred embodiment of the invention, the gear has a cross section that is circular or deviates from a circular cross section.

In a preferred embodiment of the invention, the handle comprises a shaft, wherein the shaft is connected to an axis of rotation of the gear.

In a preferred embodiment of the invention, the shaft of the handle and the gear are attached to each other in a poka yoke manner so that the shaft of the handle can only be attached to the gear at a certain angle of rotation. For example, the shaft should only be attached in two positions to the gear, wherein both positions differ by 180°. This allows the shaft to be pressed in the same directions to open the safety door no matter whether the door handle system is installed on safety doors that open to the left or on safety doors that open to the right.

In a preferred embodiment of the invention, the bolt is arranged closer to the gear in the first position than in the second position of the frame structure.

In a preferred embodiment of the invention, the bolt is arranged stationary with respect to the frame structure. If the frame structure is displaced, the bolt is so too. The bolt cannot be moved independently from the frame structure.

In a preferred embodiment of the invention, the gear is in contact with the gear rack of the second and third side in the starting position. Upon rotating from the starting position into the end position, the gear is only in contact with the gear rack of the second side or the gear rack of the third side. This allows the handle to be rotated in two (opposite) directions, thereby moving the frame structure in the same direction. Since the gear is only in contact with the gear racks of the second and third side in the starting position, the gear racks will not block the rotation of the gear itself.

In a preferred embodiment of the invention, the gear is on contact with only one gear rack in its end position. Therefore, pressing the handle in the opposite direction would result in displacing the frame structure in the other direction. The bolt then retracts back into the housing.

In a preferred embodiment of the invention, the gear in form of the sector gear comprises a plurality of teeth, wherein the first tooth is in contact with the gear rack of the second side when the sector gear is in the starting position and wherein the last tooth is in contact with the gear rack of the third side when the sector gear is in the starting position.

This allows the handle to be turned clockwise or counter-clockwise, wherein the frame structure moves in the same direction.

In a preferred embodiment of the invention, the first and the last tooth are smaller than the teeth in between. This reduces the changes that the gear might get stuck between the two gear racks. The first or the last tooth then push the frame structure further to the bolt opening until the neighboured second or the neighboured next-to-last tooth gets into contact with the respective gear rack to push it even further. The wording "smaller" means that the respective tooth does not protrude as far as the other ones. In other word, the length is shorter.

In a preferred embodiment of the invention, the gear rack of the second side comprises a first and a second tooth, wherein the first tooth of the sector gear rests in between them in the starting position. The first tooth of the gear rack of the second side is larger than the second tooth of the gear rack of the second side. The first tooth of the gear rack of the second side is arranged closer to the bolt than the second tooth of the gear rack of the second side. In addition or alternatively, the gear rack of the third side comprises a first and a second tooth, wherein the last tooth of the sector gear rests in between them in the starting position. The first tooth of the gear rack of the third side is larger than the second tooth of the gear rack of the third side. The first tooth of the gear rack of the third side is arranged closer to the bolt than the second tooth of the gear rack of the third side. This measure also assures that the gear does not get stuck between the two gear racks. The first or the last tooth of the gear are still be able to push the frame structure and do not get stuck with the tooth next in line within the respective gear rack, because this tooth (next in line) is smaller than the previous one. The wording "smaller" means that that the respective tooth does not protrude as far as the ne. In other word, the length is shorter In a preferred embodiment of the invention, the gear is configured to get (all the time) into contact with the gear rack of the second side between the starting position and the end position if the handle is pressed counter-clockwise and wherein the gear is configured to get (all the time) into contact with the gear rack of the third side between the starting position and the end position if the handle is pressed clockwise. However, the frame structure is pushed in the same direction, no matter in what direction the handle is pressed.

In a preferred embodiment of the invention, the teeth on the gear in form of a sector gear used for getting into contact with the corresponding gear rack are arranged within an angular range that is less than 190°. Therefore, the teeth are not arranged around 360° around the axis of rotation of the gear.

In a preferred embodiment of the invention, the bolt unit comprises at least one bolt locker which is arranged within the housing, wherein the at least one bolt locker is configured to engage with the bolt in the first position of the frame structure thereby preventing the bolt from being accidently extended out of the housing.

In a preferred embodiment of the invention, the bolt comprises a recess into which the bolt locker engages.

In a preferred embodiment of the invention, the bolt locker is spring loaded. This means that the bolt locker automatically engages with the bolt if the frame structure reaches its first position.

In a preferred embodiment of the invention, the door handle system comprises a lock unit. The lock unit comprises a housing, wherein the housing has a lock opening. The bolt is insertable into the lock opening when the frame structure moves to the second position and if the safety door is in a closed state. The lock unit comprises a sensor module, wherein the sensor module is configured to release the bolt locker thereby allowing the bolt to be extended out of the housing of the bolt unit upon operating the handle.

In a preferred embodiment of the invention, the sensor module is configured to apply a force to move the bolt locker. For example, this can be done by using a magnet or by moving an activation means respectively an activation member like a lever for example.

In a preferred embodiment of the invention, the sensor module is configured to transmit a status signal to a processing unit upon locking and/or opening of the safety door. The processing unit can be a central processing unit which in turn controls a machinery (like a robot) within in sealed environment protected by the door handle system. If the safety door is open, then the machinery cannot start. However, the processing unit can also part of the control of the machinery. In that case, the sensor module is directly linked to the machinery.

In a preferred embodiment of the invention, the bolt unit is configured to be mounted to a safety door that opens to the right or by turning the bolt unit by 180° to a safety door that opens to the left without changing the frame structure. The wording "turning the bolt unit by 180°" is to be understood in such a way that the handle is still arranged on the same side of the safety door.

In a preferred embodiment of the invention, the housing of the bolt unit comprises a fastening opening opposite to the bolt opening. The frame structure comprises a fourth side opposite to the first side, wherein the fourth side comprises a fastening part. The fastening part is configured to protrude out of the fastening opening of the housing if the frame structure is in the first position. The fastening part is arranged within the housing if the frame structure is in the second position. The fastening part is configured to engage with a fastening mean, respectively a fastening member, thereby limiting the movement of the frame structure respective to the housing. It is very beneficial that an additional fastening part is present. An operator who wants to go into a sealed environment (for example a cage in which a robot operates) can indicate his presents in the sealed environment by attaching a personal lock (for example a U-Bolt lock) to the fastening part. In return, the bolt will not move out of the bolt opening, because the movement is limited by the fastening mean attached by the operator since the fastening mean cannot be moved into the housing through the fastening opening. As such, even if the bolt stopper engages with the activation mean, the bolt stopper cannot switch from the blocking position into the release position. Therefore, the door handle system would not be able to transmit a status signal indicating that the safety door is successfully closed thereby allowing a machinery inside the sealed environment to start up.

In a preferred embodiment of the invention, the fastening part comprises a joint and is therefore configured to be rotated (around the axis through the joint). Preferably, the fastening part comprises a fastener which is jointly connected to the fastening part.

In a preferred embodiment of the invention, the first side and the fourth side of the frame structure are parallel to each other. In addition or alternatively, the second side and the third side of the frame structure are parallel to each other.

In a preferred embodiment of the invention, the bolt and/or the frame structure are made of steel, especially stainless steel. The same could also apply for the respective gear rack and/or the gear itself.

Figure 2B:
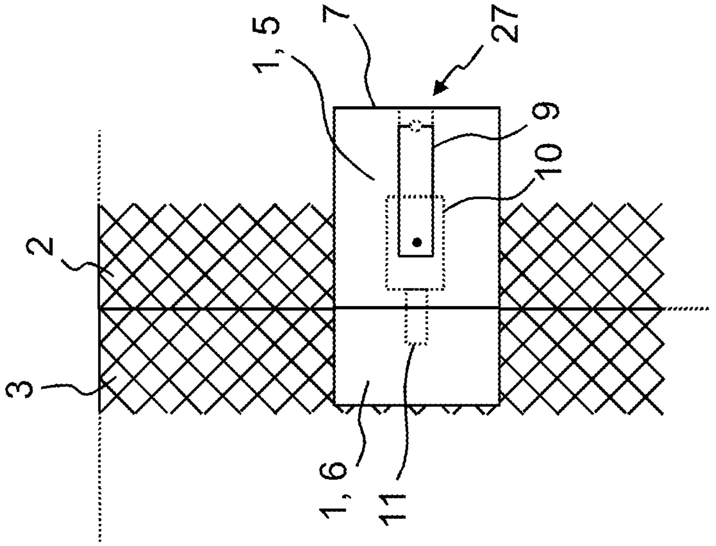
Figure 2A:
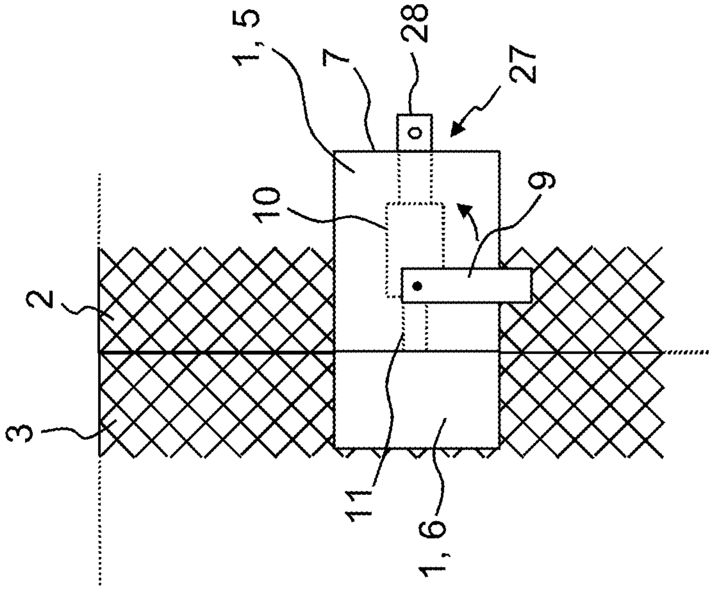
Figure 3B:
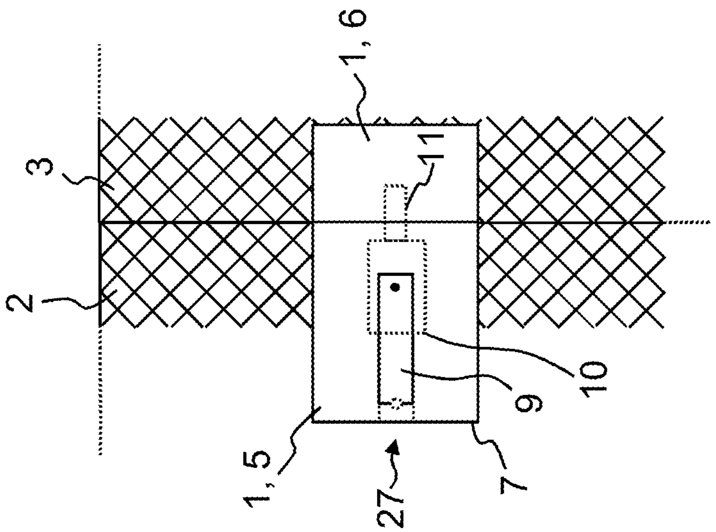
Figure 3A:
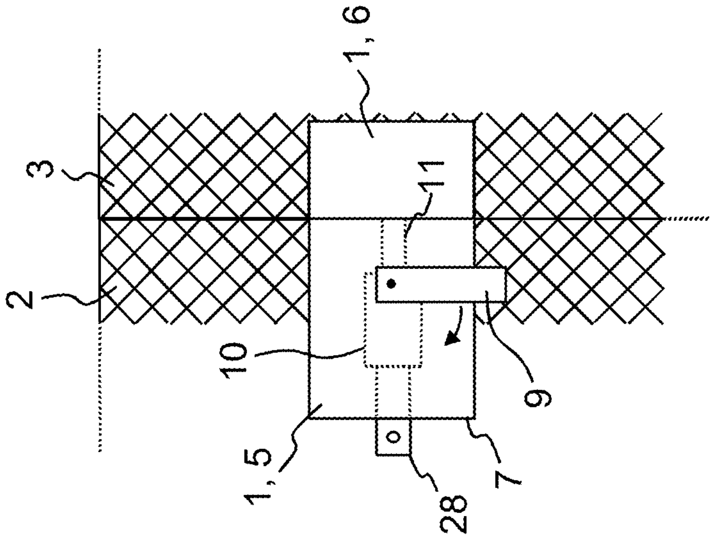
Figure 4:
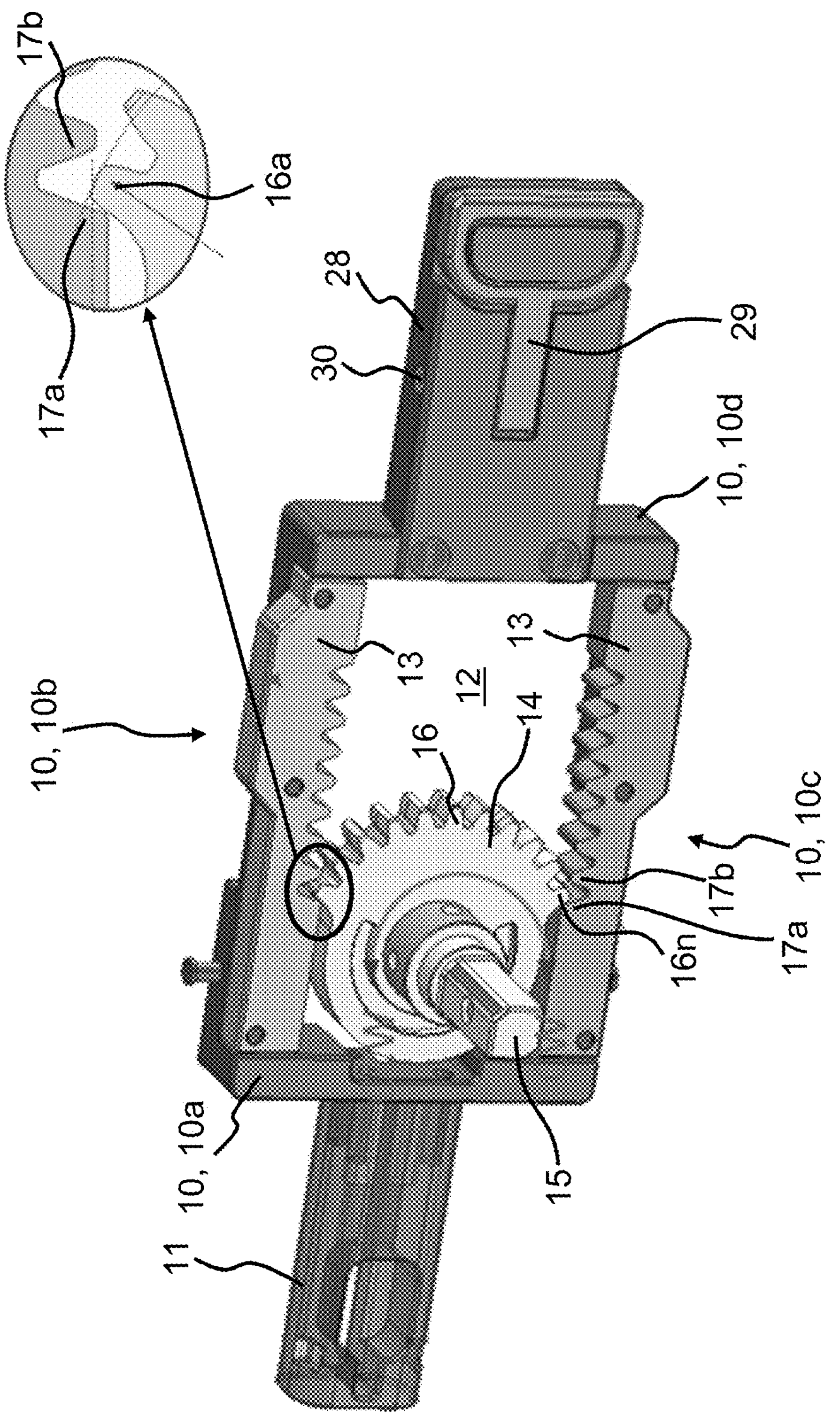
Figure 5:
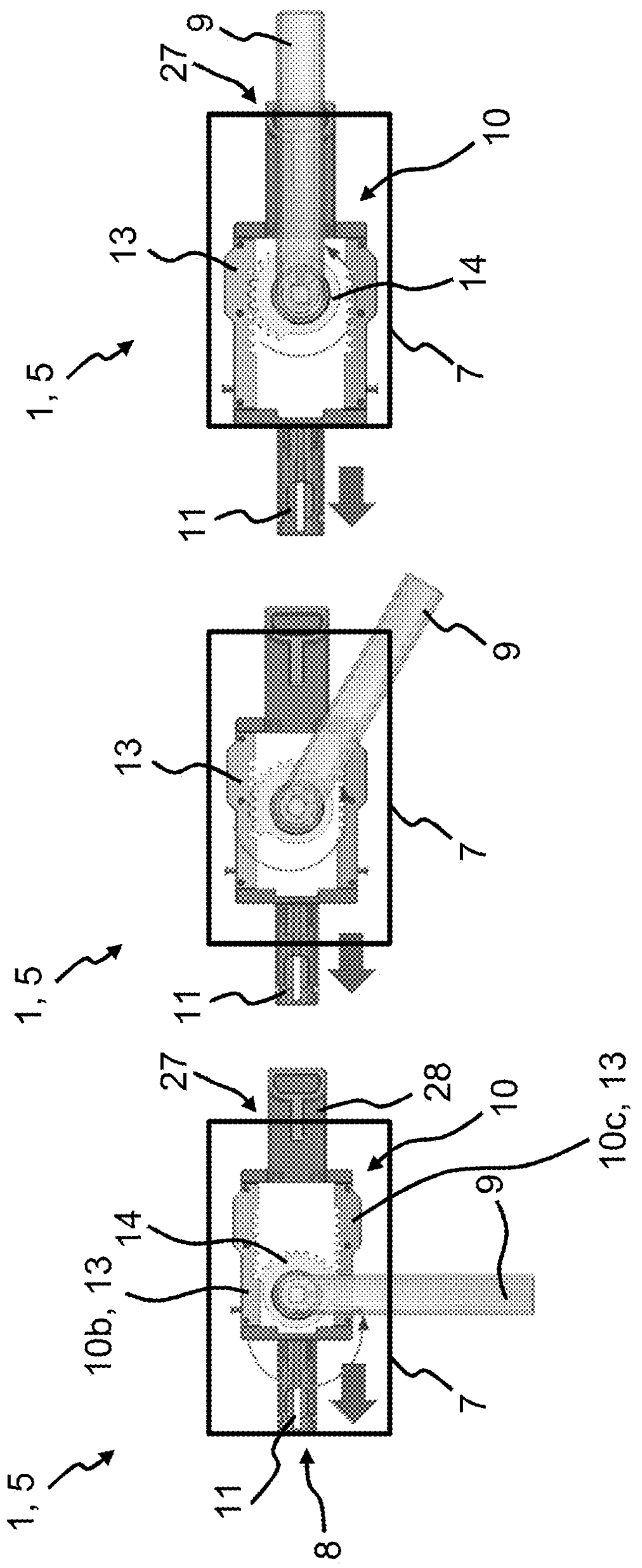
Figure 6:
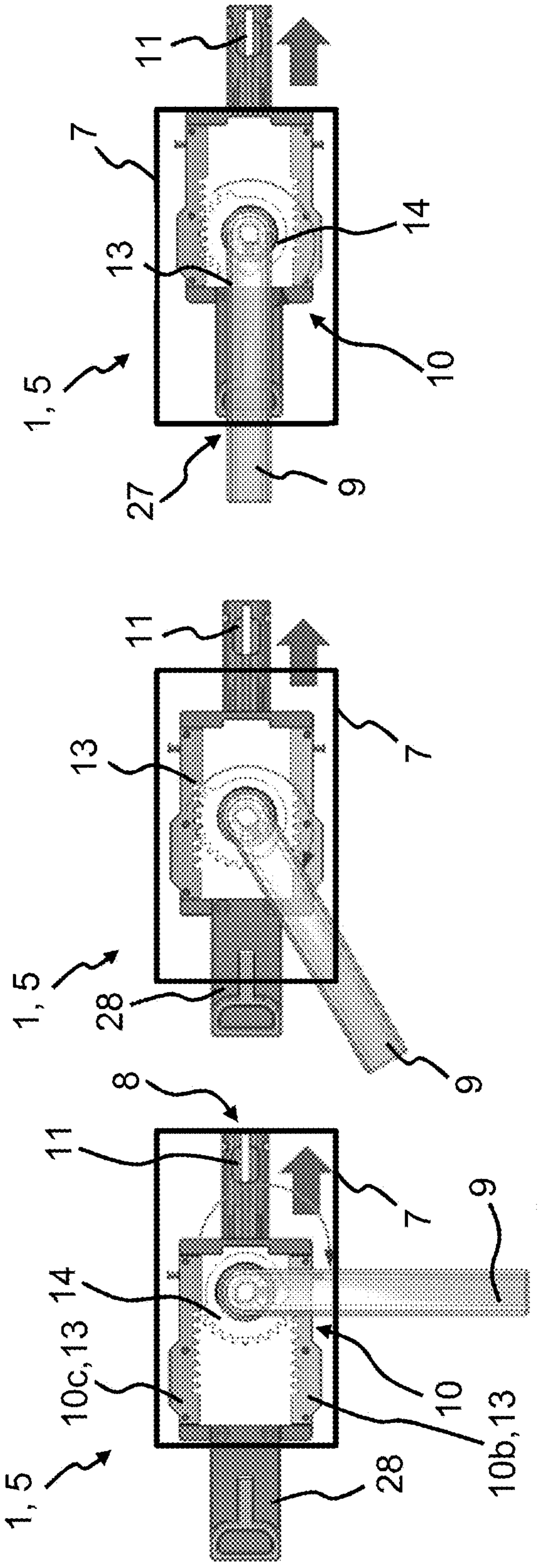
Figure 7:
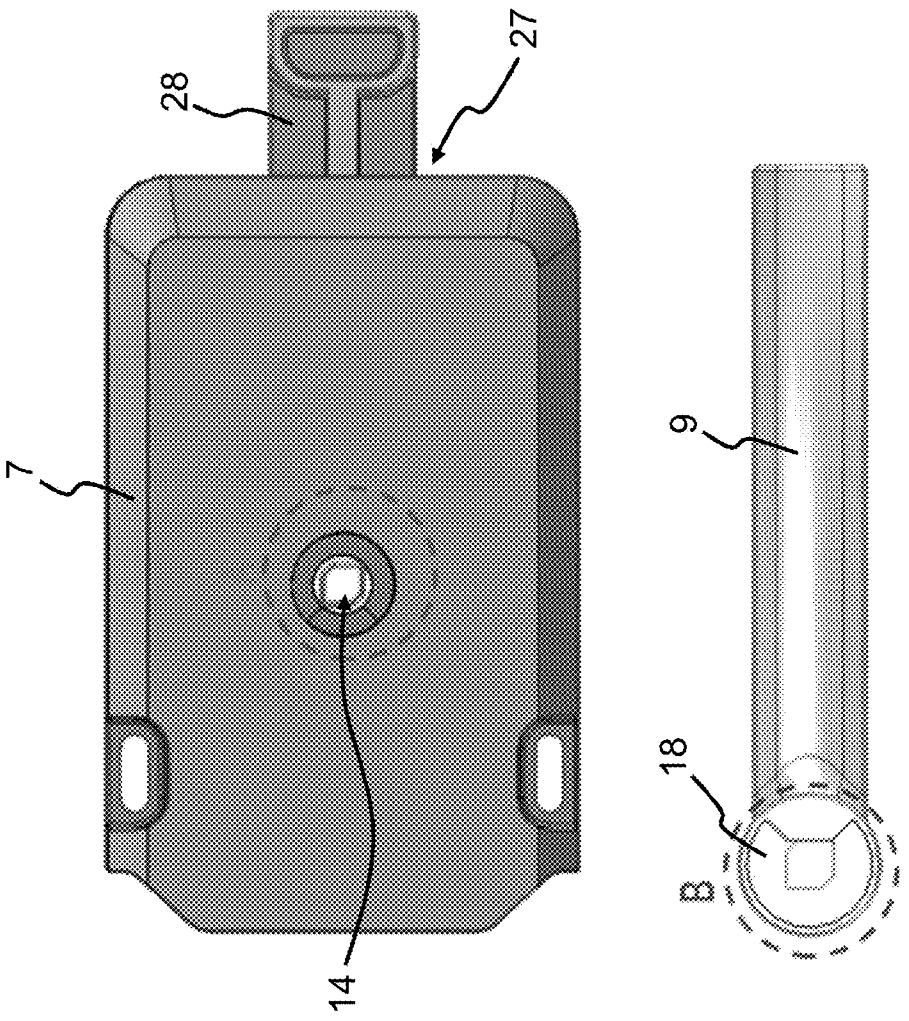
Figure 8:
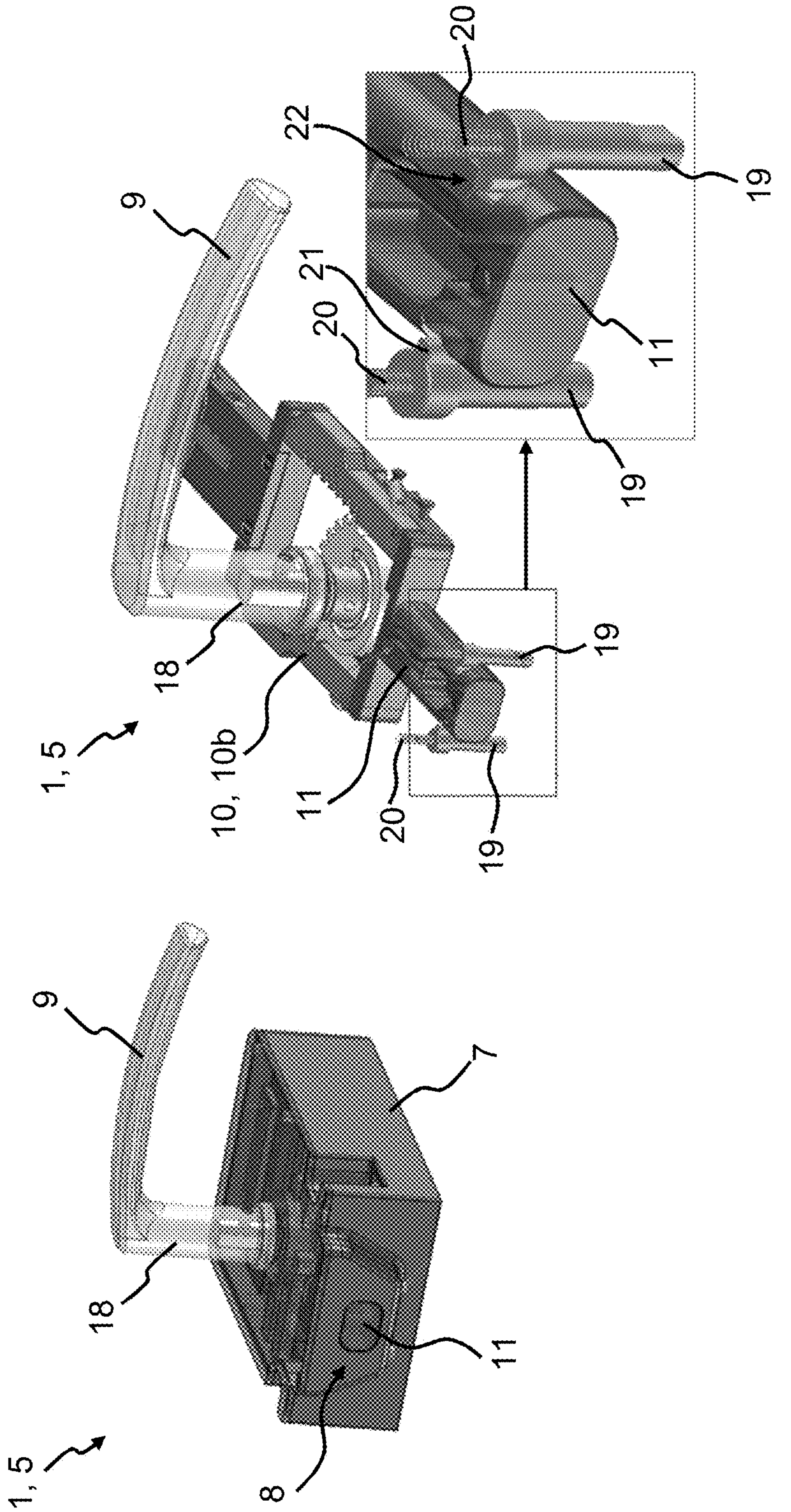
Figure 9:
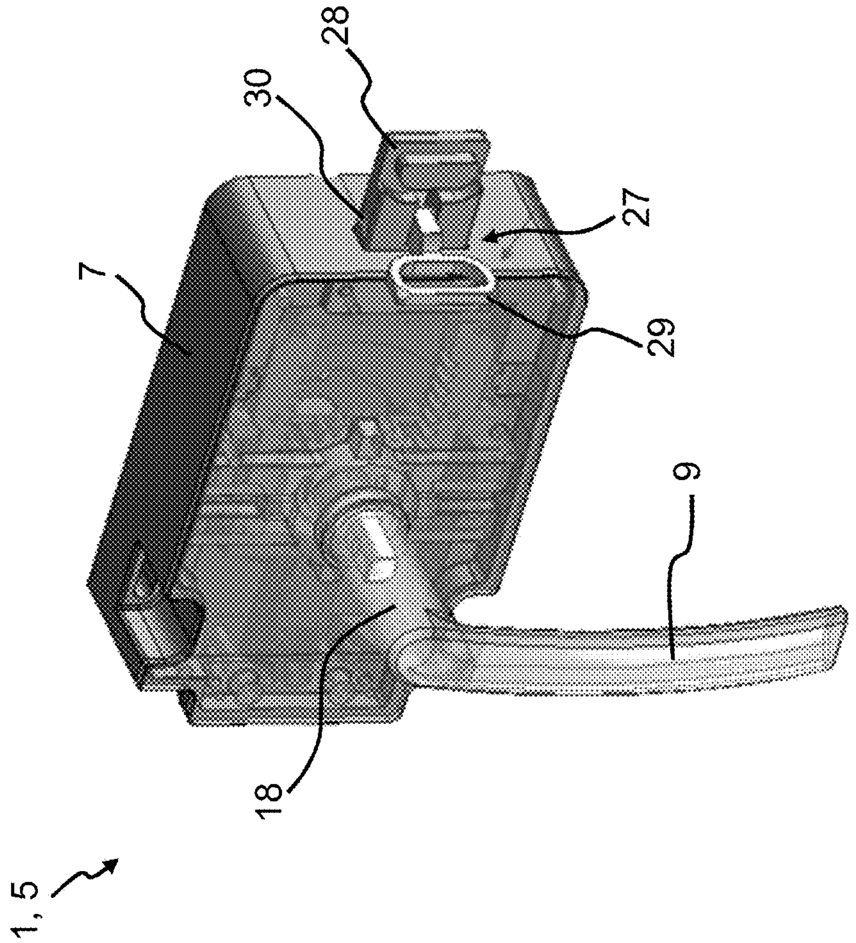

Different embodiments of the invention will be described in the following, by way of example and with reference to the drawings. The same elements are provided with the same reference signs. The figures show in detail:

FIG. 1: an installation of a door handle system according to the present invention at a safety door in form of a swing door and a sliding door;

FIGS. 2A, 2B: a door handle system installed at a safety door with a bolt unit and a lock unit, wherein the safety door opens to the right;

FIGS. 3A, 3B: a door handle system installed at a safety door with a bolt unit and a lock unit, wherein the safety door opens to the left;

FIG. 4: an embodiment of a frame structure of the bolt unit together with a gear arranged in a receiving room enclosed by the frame structure;

FIG. 5: the embodiment of FIG. 4, wherein the movement of the gear from a starting position to an end position with respect to the frame structure is described;

FIG. 6: a similar embodiment as the one of FIG. 5 with the bolt unit being installed on a safety door that opens to the left instead;

FIG. 7: an embodiment describing how the shaft of the handle is attached to the gear in a poka yoke manner;

FIG. 8: an embodiment describing how the movement of the bolt is blocked by the use of a bolt locker; and FIG. 9: an embodiment describing how an operator can attach a personal lock to the frame structure so that the door handle system cannot close a safety door.

FIG. 1 shows a door handle system 1 for a safety door 2, especially for a sliding door 2*a* or swing door 2*b*. Furthermore, a cage 3 is shown enclosing a sealed environment 4 in which a machine, for example in form of a robot, is operating. Upon opening the safety door 2, the door handle system 1 is preferably configured to transmit a status update so that the machine within the sealed environment 4 stops. This status update could be transmitted directly to the machine or indirectly via a central processing unit (not shown), which in turn turns off the machine. Upon closing the safety door 2, the door handle system 1 is preferably configured to transmit another status update so that the machine arranged within the sealed environment 4 resumes operation.

FIGS. 2A and 2B show an embodiment of the door handle system 1 arranged on a safety door 2.

As can be seen, the door handle system 1 comprises two units. A bolt unit 5 and a lock unit 6. The bolt unit 5 comprises a housing 7 with a bolt opening 8 (shown for example in FIG. 8), and a handle 9. The handle 9 is arranged at the housing 7. The bolt unit 5 comprises a frame structure 10 with a bolt 11. The bolt 11 is moveable respective to the housing 7. The bolt 11 can be moved out of the bolt opening 8 of the housing 7 for engaging with a corresponding lock opening of the lock unit 6. Within FIG. 2A, the bolt 11 is arranged within the housing 7 of the bolt unit 5. Within FIG. 2B, the bolt 11 is pushed out of the housing 7 of the bolt unit 5 into the corresponding lock opening of the lock unit 6. To do so, the handle 9 is pressed and (in this case) rotated by 90° in a counter-clockwise direction. As can be seen, the frame structure 10 is displaced thereby pushing the bolt 11 out of the bolt opening 8.

In FIG. 2A, the frame structure 10 is in a first position. The bolt 11 is arranged within the housing 7 of the bolt unit 5. In FIG. 2B, the frame structure 10 is in a second position. The bolt 11 protrudes out of the bolt opening 8 of the housing 7 of the bolt unit 5.

The housing 7 of the bolt unit 5 comprises a fastening opening 27 opposite to the bolt opening 8. The frame structure 10 comprises a fourth side 10*d* opposite to the first side 10*a*. The fourth side 10*d* comprises a fastening part 28. The fastening part 28 is configured to protrude out of the fastening opening 27 of the housing 7 if the frame structure 10 is in the first position (shown in FIG. 2A). Contrary to that, the fastening part 28 is arranged within the housing 7 if the frame structure 20 is in the second position. The fastening part 28 is configured to engage with a fastening mean (for example a U-bolt lock) thereby limiting the movement of the frame structure 10 respective to the housing 7.

Within FIGS. 2A and 2B, the lock unit 6 is configured to be arranged stationary and the bolt unit 5 is configured to be arranged on the movable safety door 2. In general, the bolt unit 5 could also arranged stationary and the lock unit 6 could be arranged on the movable safety door 2.

Within FIGS. 3A and 3B, the bolt unit 5 is turned by 180° and can therefore be used at a safety door 2 that opens to the left. The movement of the handle 9 stays the same. The user can press the handle 9 in a clockwise direction for pushing the bolt 11 out of the bolt opening 8.

FIG. 4 shows the frame structure 10 in more detail. The frame structure 10 comprises a first side 10*a*, a second side 10*b*, a third side 10*c* and a fourth side 10*d*. The first and the fourth side 10*a*, 10*d* are preferably arranged in parallel. The second and the third side 10*b*, 10*c* are preferably arranged in parallel.

The second and third side 10*b*, 10*c* are preferably arranged perpendicular to the first and the fourth side 10*a*, 10*d*.

The frame structure 10 is arranged in the housing 7 of the bolt unit 5. The frame structure 10 is moveable with respect to the housing 7. The frame structure 10 encloses a receiving room 12.

The bolt 11 is arranged at the first side 10*a* of the frame structure 10. The bolt 11 can be screwed to the frame structure 10. Also, the bolt 11 and the frame structure 10 can be made of a single piece.

The second side 10*b* and the third side 10*c* each comprise a gear rack 13 directed to the receiving room 12, so that the gear racks 13 of the second and third side 10*b*, 10*c* face each other. In that case, the gear racks 13 are screwed to the frame structure 10. The gear racks 13 are preferably arranged parallel to each other. However, the gear racks 13 and the frame structure 10 could be made of a single piece. Both gear racks 13 preferably have the same number of teeth. Both gear racks 13 are preferably arranged symmetrically to each other, especially defined by a longitudinal axis running through the frame structure 10.

The bolt unit 5 comprises a gear 14, especially in form of a sector gear 14, which is arranged within the receiving room 12. The handle 9 is attached to the gear 14 so that pressing the handle 9 translates into a rotation of the gear 14. Upon rotation of the gear 14 from a starting position (shown in FIG. 4) to an end position (shown in FIG. 5), the gear 14 is configured to get into contact with the corresponding gear rack 13, causing the frame structure 10 to be displaced from the first position into the second position in relation to the housing 7 thereby pushing the bolt 11 out of the bolt opening 8. As indicated by the arrows, the gear 14 can be rotated clockwise or counter-clockwise. If rotated counter-clockwise, then the gear 14 will come into contact with the gear rack 13 of the second side 10*b*. If rotated clockwise, then the gear 14 will come into contact with the gear rack 13 of the third side 10*c*. In both times, the frame structure 10 will move in the same direction (from the first position to the second position) with respect to the housing 7.

The gear 14 is arranged rotatable but stationary with respect to the housing 7.

The housing can have guiding nuts for guiding the frame structure 10.

The handle 9 comprises a shaft 15, wherein the shaft 15 is connected to an axis of rotation of the gear 14.

As can be seen, the gear 14 is in contact with the gear rack 13 of the second side 10*b* and the gear rack 13 of third side 10*c* when the gear 14 is in the starting position. Upon rotating from the starting position into the end position, the gear 14 is only in contact with one gear rack 13, namely the gear rack 13 of the second side 10*b* or the gear rack 13 of the third side 10*c*.

The gear 14 in form of the sector gear 14 comprises a plurality of teeth 16, wherein a first tooth 16*a* is in contact with the gear rack 13 of the second side 10*b* when the sector gear 14 is in the starting position. A last tooth 16*n* is in contact with the gear rack 13 of the third side 10*c* when the sector gear 14 is in the starting position.

As also can be seen, the first tooth 16*a* and the last tooth 16*n* of the gear 14 are smaller (shorter in length) than the teeth 16 in between. This prevents the sector gear 14 from being stuck between the two gear racks 13.

The same preferably also applies to the gear rack 13 of the second and third side 10*b*, 10*c*. The gear rack 13 of the second side 10*b* comprises a first tooth 17*a* and a second tooth 17*b* between which the first tooth 16*a* of the sector gear 14 rests in the starting position. The first tooth 17*a* of the gear rack 13 of the second side 10*b* is larger (protrudes further into the receiving room 12) than the second tooth 17*b* of the gear rack 13 of the second side 10*b*. In addition, the first tooth 17*a* of the gear rack 13 of the second side 10*b* is arranged closer to the bolt 11 than the second tooth 17*b* of the gear rack 13 of the second side 10*b*. In addition, the gear rack 13 of the third side 10*c* comprises a first tooth 17*a* and a second tooth 17*b* in between which the last tooth 16*n* of the sector gear 14 rests in the starting position. The first tooth 17*a* of the gear rack 13 of the third side 10*c* is larger (protrudes further into the receiving room 12) than the second tooth 17*b* of the gear rack 13 of the third side 10*c*. The first tooth 17*a* of the gear rack 13 of the third side 10*c* is arranged closer to the bolt 11 than the second tooth 17*b* of the gear rack 13 of the third side 10*c*.

The teeth 16, 16*a*, 16*n* on the gear 14 in form of a sector gear 14 used for getting into contact with the corresponding gear rack 13 are arranged within an angular range that is less than 190°. Preferably, (approximately) half of the teeth 16, 16*a*, 16*n* get in contact with the gear rack 13 of the second side 10*b* if the sector gear 14 is rotated counter-clockwise and (approximately) the other half of the of the teeth 16, 16*a*, 16*n* get in contact with the gear rack 13 of the third side 10*c* if the sector gear 14 is rotated clockwise.

In addition, it can be seen that the fourth side 10*d* comprises the fastening part 28. The fastening part 28 is configured to engage with a fastening mean (for example a U-bolt lock) thereby limiting the movement of the frame structure 10 respective to the housing 7. The fastening part 28 comprises fastener 29 which is connected to the fastening part 28 through a joint 30. The fastener 29 is therefore configured to be rotated (around the axis through the joint 30). The fastener 29 comprises an opening so that a U-bolt lock of a user can engage with the opening, thereby preventing that the bolt 11 protrudes out of the bolt opening 8.

FIG. 5 describes the movement of the gear 14 from the starting position to the end position with respect to the frame structure 10. In the left drawing, the starting position is shown which was described in FIG. 4. Upon pressing the handle 9 in a counter-clockwise direction, the teeth 16, 16*a* of the sector gear 14 start engaging with the corresponding teeth 17*a*, 17*b* of the gear rack 13 of the second side 10*b* of the frame structure 10, thereby displacing the frame structure 10 to the left. This position is shown by the drawing in the middle. After further pressing the handle 9 in the counter-clockwise position, the end position is reached as shown in the drawing to the right. After leaving the starting position, the sector gear 14 only engages with one gear rack 13. As can also be seen, the handle 9 and the sector gear 14 are arranged stationary with respect to the housing 7.

FIG. 6 describes a similar embodiment as FIG. 5. However, the bolt unit 5 is rotated by 180°. In that regard, the bolt unit 5 can be attached for safety doors 2 that open to the left. In the left drawing, the starting position is shown. Upon pressing the handle 9 in a clockwise direction, the teeth 16, 16*a* of the sector gear 14 start engaging with the corresponding teeth 17*a*, 17*b* of the gear rack 13 of the third side 10*c* of the frame structure 10, thereby displacing the frame structure 10 to the left. This position is shown by the drawing in the middle. After further pressing the handle 9 in the clockwise position, the end position is reached as shown in the drawing to the right. After leaving the starting position, the sector gear 14 only engages with one gear rack 13. As can also be seen, the handle 9 and the sector gear 14 are arranged stationary with respect to the housing 7. The handle 9 could also be rotated in the counter-clockwise direction.

FIG. 7 describes that a shaft 18 of the handle 9 and the gear 14 are attached to each other in a poka yoke manner so that the shaft 18 of the handle 9 can only be attached to the gear 14 at a certain angle of rotation. In that case, the form of the connection of the shaft 18 and the form of the corresponding connection of the gear 14 is such that the handle 9 can only attached at one position to the gear 14. However, it is also possible that the handle 9 can be attached at two or three positions to the gear 14. For example, the handle 9 can be installed in a 90° and a 270° position only. The 270° position could be used for right hinged doors 2 and the 90° position could be used for left hinged doors 2. If the whole door handle system 1 is rotated by 180°, then the 270° position could be used for left hinged doors 2 and the 90° position could be used for right hinged doors 2. Preferably, the handle 9 can always be attached the same way, no matter whether the bolt unit 5 is attached to safety doors 2 that open to the left or to safety doors 2 that open to the right. In other words, the handle can be orientated the same in the starting position. Thus, the user can rotate the handle 9 in the same direction. Therefore, the user expectations are not disturbed.

FIG. 8 shows an embodiment of a bolt unit 5 that comprises at least one bolt locker 19 which is arranged within the housing 7 of the bolt unit 5. The at least one bolt locker 19 is configured to engage with the bolt 11 in the first position of the frame structure 10 thereby preventing the bolt 11 from being released out of the housing 7. The bolt 11 cannot move to the second position, because the bolt locker 19 blocks that movement. The bolt locker 19 comprises a spring 20 and is therefore spring loaded. Thus, the bolt locker 19 automatically engages with the bolt 11 if the frame structures 10 reaches its first position. The bolt locker 19 which preferably is in the form of a bolt, comprises a protrusion 21 which is configured to engage with a corresponding recess 22 in the bolt 11, thereby locking the movement of the bolt 11. In turn, the handle 9 cannot be rotated anymore. In FIG. 8, two bolt lockers 19 are provided, wherein the bolt 11 rests in between both bolt lockers 19 when the frame structure 10 is in the first position.

For disengaging the bolt locker 19, the lock unit 6 preferably comprises a sensor module (not shown), wherein the sensor module is configured to release the bolt locker 19 thereby allowing the bolt 11 to be extended from the housing 7 of the bolt unit 5 upon pressing the handle 9. This disengaging can be achieved by applying a magnetic field or by applying mechanical activation means for example. In that case the bolt locker 19 would be lifted so that the protrusion 21 of the bolt locker 9 leaves the recess 22.

The sensor module can be connected to a central processing system which provides an information to unlock the bolt 11 to the sensor module. The sensor module can also comprise a card reader system or an NFC system, so that the user can unlock the bolt 11 directly at the door handle system 1.

FIG. 9 again shows the fastening part 28 which comprises the fastener 29. The fastener 29 is connected to the fastening part 28 through the joint 30. The fastener 29 is rotated around the axis of the joint 30 to ease the attachment of a U-bolt lock for example. By adding such a U-bolt lock, the fastening part 28 cannot be retracted into the fastening opening 27 anymore. Thus, a person can indicate his/her presence in the sealed environment 4.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

REFERENCE SIGNS

Door handle system 1
Safety door 2
Sliding door 2*a*
Swing door 2*b*
Cage 3
Sealed environment 4
Bolt unit 5
Lock unit 6
Housing (of bolt unit) 7
Bolt opening 8
Handle 9
Frame structure 10
Bolt 11
Receiving room 12
Gear rack 13
Gear (sector gear) 14
Shaft 15
Teeth (sector gear) 16, 16*a*, 16*n*
Teeth (gear rack) 17*a*, 17*b*
Shaft 18
Bolt locker 19
Spring 20
Protrusion (bolt locker) 21
Recess (bolt) 22
Fastening opening 27
Fastening part 28
Fastener 29
Joint 30

The invention claimed is:

1. A door handle system for a safety door, comprises the following features:

a bolt unit is provided, wherein the bolt unit comprises a housing with a bolt opening, and a handle, wherein the handle is arranged at the housing;

the bolt unit comprises a frame structure with a bolt, wherein the frame structure is arranged in the housing and wherein the frame structure is moveable with respect to the housing;

the frame structure encloses a receiving room;

the bolt is arranged at a first side of the frame structure, wherein a second side and a third side of the frame structure are arranged opposite to each other;

the second side and the third side each comprise a gear rack directed to the receiving room, so that the gear racks of the second side and third side face each other;

the bolt unit comprises a gear which is arranged within the receiving room;

the handle is attached to the gear so that pressing the handle trans-lates into a rotation of the gear;

upon rotation of the gear from a starting position to an end position, the gear is configured to get into contact with the corresponding gear rack, causing the frame structure to be displaced from a first position into a second position in relation to the housing thereby pushing the bolt out of the bolt opening, wherein the bolt is arranged closer to the gear in the first position than in the second position of the frame structure.

2. The door handle system according to claim 1, wherein the gear is arranged rotatable but stationary with respect to the housing.

3. The door handle system according to claim 1, wherein the handle comprises a shaft, wherein the shaft is connected to an axis of rotation of the gear.

4. The door handle system according to claim 3, wherein the shaft of the handle and the gear are attached to each other in a poka yoke manner so that the shaft of the handle can only be attached to the gear at a certain angle of rotation.

5. The door handle system according to claim 1, wherein the gear is in contact with the gear rack of the second side and the gear rack of third side in the starting position and wherein the gear is only in contact with the gear rack of the second side or the gear rack of the third side upon rotating from the starting position into the end position.

6. The door handle system according to claim 1, wherein the gear is con-figured to get into contact with the gear rack of the second side between the starting position and the end position if the handle is pressed counter-clockwise and wherein the gear is configured to get into contact with the gear rack of the third side between the starting position and the end position if the handle is pressed clockwise.

7. The door handle system according to claim 1, wherein the teeth on the gear in form of a sector gear used for getting into contact with the corresponding gear rack are arranged within an angular range that is less than 190°.

8. The door handle system according to claim 1, wherein the bolt unit comprises at least one bolt locker which is arranged within the housing, wherein the at least one bolt locker is configured to engage with the bolt in the first position of the frame structure thereby preventing the bolt to be accidently extended from the housing.

9. The door handle system according to claim 8, wherein the door handle system comprises a lock unit, wherein the lock unit comprises a housing, wherein the housing has a lock opening, wherein the bolt is insertable into the lock opening in a closed state of the safety door when the frame structure moves to the second position, wherein the lock unit comprises a sensor module, wherein the sensor module is configured to release the bolt locker thereby allowing the bolt to be extended from the housing of the bolt unit upon pressing the handle.

10. The door handle system according to claim 1, wherein the bolt unit is configured to be mounted to a safety door that opens to the right or by turning the bolt unit by 180° to a safety door that opens to the left with-out changing the frame structure.

11. The door handle system according to claim 1, wherein the safety door is one of a sliding door and a swing door.

12. The door handle system according to claim 1, wherein the gear is a sector gear.

13. The door handle system according to claim 1, both gear racks are arranged symmetrically to each other as defined by a longitudinal axis running through the frame structure.

14. A door handle system for a safety door, comprises the following features:

a bolt unit is provided, wherein the bolt unit comprises a housing with a bolt opening, and a handle, wherein the handle is arranged at the housing:

the bolt unit comprises a frame structure with a bolt, wherein the frame structure is arranged in the housing and wherein the frame structure is moveable with respect to the housing;

the frame structure encloses a receiving room;

the bolt is arranged at a first side of the frame structure, wherein a second side and a third side of the frame structure are arranged opposite to each other;

the second side and the third side each comprise a gear rack directed to the receiving room, so that the gear racks of the second side and third side face each other;

the bolt unit comprises a gear which is arranged within the receiving room;

the handle is attached to the gear so that pressing the handle trans-lates into a rotation of the gear:

upon rotation of the gear from a starting position to an end position, the gear is configured to get into contact with the corresponding gear rack, causing the frame structure to be displaced from a first position into a second position in relation to the housing thereby pushing the bolt out of the bolt opening, wherein the gear in form of a sector gear comprises a plurality of teeth, wherein the first tooth is in contact with the gear rack of the second side when the sector gear is in the starting position and wherein the last tooth is in contact with the gear rack of the third side when the sector gear is in the starting position, and wherein the first and the last tooth are smaller than the teeth of the sector gear in between.

15. The door handle system according to claim 14, wherein the gear rack of the second side comprises a first and a second tooth in between the first tooth of the sector gear rests in the starting position, wherein the first tooth of the gear rack of the second side is larger than the second tooth of the gear rack of the second side and wherein the first tooth of the gear rack of the second side is arranged closer to the bolt than the second tooth of the gear rack of the second side.

16. The door handle system according to claim 14, wherein the gear rack of the third side comprises a first and a second tooth in between the last tooth of the sector gear rests in the starting position, wherein the first tooth of the gear rack of the third side is larger than the second tooth of the gear rack of the third side and wherein the first tooth of the gear rack of the third side is arranged closer to the bolt than the second tooth of the gear rack of the third side.

17. A door handle system for a safety door, comprises the following features:

a bolt unit is provided, wherein the bolt unit comprises a housing with a bolt opening, and a handle, wherein the handle is arranged at the housing;

the bolt unit comprises a frame structure with a bolt, wherein the frame structure is arranged in the housing and wherein the frame structure is moveable with respect to the housing:

the frame structure encloses a receiving room;

the bolt is arranged at a first side of the frame structure, wherein a second side and a third side of the frame structure are arranged opposite to each other;

the second side and the third side each comprise a gear rack directed to the receiving room, so that the gear racks of the second side and third side face each other;

the bolt unit comprises a gear which is arranged within the receiving room:

the handle is attached to the gear so that pressing the handle trans-lates into a rotation of the gear;

upon rotation of the gear from a starting position to an end position, the gear is configured to get into contact with the corresponding gear rack, causing the frame structure to be displaced from a first position into a second position in relation to the housing thereby pushing the bolt out of the bolt opening, wherein the housing of the bolt unit comprises a fastening opening opposite to the bolt opening and wherein the frame structure comprises a fourth side opposite to the first side, wherein the fourth side comprises a fastening part and wherein where in the fastening part is configured to protrude out of the fastening opening of the housing if the frame structure is in the first position and wherein the fastening part is arranged within the housing if the frame structure is in the second position and wherein the fastening part is con-figured to engage with a fastening member thereby limiting the movement of the frame structure respective to the housing.

* * * * *